April 4, 1939.  H. V. CAMPBELL  2,152,869
FLOWER HOLDER
Filed May 26, 1937
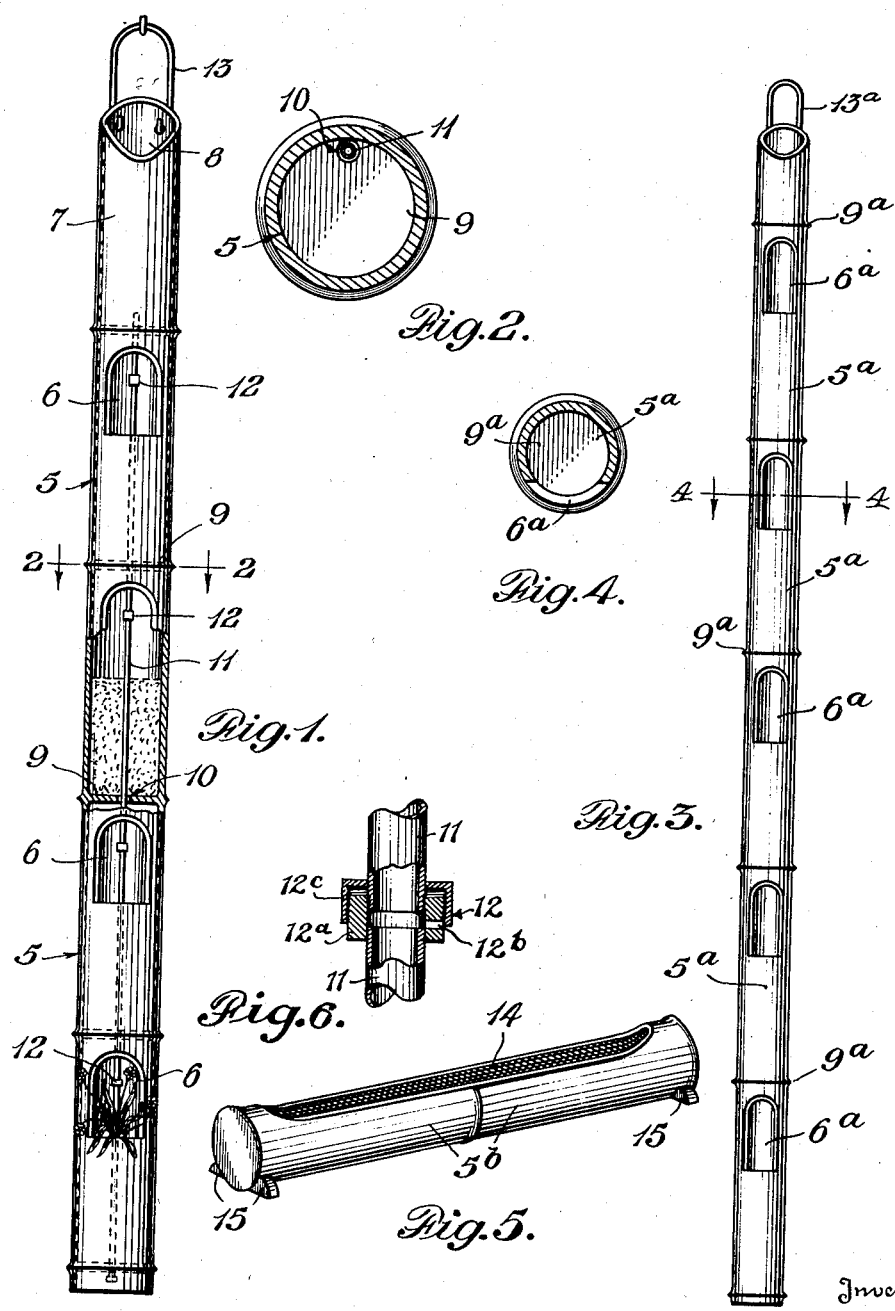
Inventor
Harry V. Campbell,
By K. S. Doub
Attorney Patented Apr. 4, 1939

2,152,869

UNITED STATES PATENT OFFICE 2,152,869

FLOWER HOLDER

Harry V. Campbell, Charleston, W. Va.

Application May 26, 1937, Serial No. 144,923

8 Claims. (Cl. 47—38)

This invention relates to holders or containers for flowers and like plants, either of the cut or growing variety, and due to the particular shape of the holder and the product from which it is made, the holder may be aptly termed a "flower pole".

The objects and advantages of the invention over known prior devices of this type are many and varied and will at once become apparent in view of the disclosure herein. Briefly, however, the present invention provides a flower holder which is unusually attractive and unique in appearance and effect; will support flowers and like plants to their best advantage, not only from the standpoint of attractiveness and healthful condition of the flowers and plants but also in a manner such as will promote ease in maintaining such condition; is adapted for use as a decorative and beautifying medium in places where the use of conventional or known prior holders would prove awkward and more or less unsightly, and yet at the same time is of marked simplicity in construction and relatively low in cost of manufacture.

In the drawing:

Figure 1 is a view in elevation, partly broken away, of a flower holder or pole embodying the features of the present invention, the holder in this instance being particularly adapted for flowers or plants of the growing variety;

Fig. 2 is a section taken on the line 2—2, Fig. 1;

Fig. 3 is a view similar to Fig. 1 of a holder or pole particularly adapted for cut flowers;

Fig. 4 is a section on the line 4—4, Fig. 3; and

Fig. 5 is a view in perspective of a holder particularly adapted for decorating tables and the like.

Fig. 6 is an enlarged detail view of one of the irrigating valves used with the flower pole of Fig. 1.

The holder or pole is preferably made from bamboo, and in fact takes advantage of the peculiar natural structural characteristics of this tree or plant, viz: the hollow sections separated by solid joints along the length of the pole.

Referring to the drawing in detail, in Fig. 1 the pole or holder proper is generally indicated at 5, in Fig. 3 at 5ª and in Fig. 5 at 5ᵇ.

Confining the description now to Figs. 1 and 2, windows 6 are cut in the upper portion of each section or any selected number of sections of the pole except the top section, the latter serving as a water reservoir or tank 7 and having its top, or the joint which defines its top, removed to provide a filler opening 8. The windows 6 may be and preferably are simply fluted openings with a square or flat base and cover approximately one-half the circumference of the pole. The joints which separate the hollow sections are indicated at 9.

Holes 10 are formed through the joints or divisions 9 between each pair of sections, preferably at the back of the joints to avoid interference with the flowers or plants, such holes providing a drainage means for all the plant or flower-holding sections and also providing for the insertion of an irrigation pipe or analogous member 11. Irrigation pipe or tube 11 may be and preferably is of relatively small diameter, and at its upper or inlet end has a water-tight connection with the adjacent joint or partition 9, said tube extending downwardly through the flower-holding sections and having its lower end closed. Drip or irrigation members in the form of spigots, valves or like outlet-regulating members 12 are installed in the tube within the window area of the holder and are preferably adjustable to permit a predetermined supply of water to feed to the plants and soil in each section. Fig. 6 illustrates a type of valve which may be utilized, a fitting 12a shown as a connector for tube lengths) provided with a valve opening 12b being applied over the tube 11 and having threaded thereon a knurled closure member 12c. The opening 12b may be adjusted to varying degrees by turning member 12c.

The exterior surfaces of the pole may be thoroughly cleaned and sandpapered, and all surfaces, both inside and out, are made waterproof by any suitable composition or coating. One method of waterproofing which has proven highly satisfactory is to, first, sandpaper all outside surfaces; second, apply a coating of white shellac to all inside and outside surfaces; third, again sandpaper all outside surfaces; and, fourth, cover all inside and outside surfaces with a fine spar varnish or apply an enamel such as Duco to the outside surfaces. The shellac, cut down with sandpaper, forms a bond with the varnish or enamel applied as a second coating. The primer coat of shellac is important since other varnishes and enamels will not satisfactorily form a bond with the extremely hard bamboo wood.

A suitable suspension means or hanger 13 may then be connected to the top of the pole, and the latter is ready for use.

Flowers and like plants may be planted in the base of each section in soil provided for the purpose. When providing the respective partitions or sections with soil, a piece of broken crock, chip or the like should be placed over the drainage holes 10 to prevent obstruction by the soil. The water tank or reservoir 7 is then filled with water, the spigots or valves 12 adjusted and the pole suspended in the desired place.

The irrigation tube or pipe may be made of lead or like material and simply have drip outlets provided with ill-fitting wooden pegs arranged to provide a dripping or irrigation action sufficient to offset evaporation.

It will readily be seen that a holder or pole is provided which is designed for use indoors or outdoors, such as on porches, in patios, conservatories and like places. The adjusted irrigation or water supply provides a fool-proof arrangement which ensures against loss of flowers or plants due to too much or too little moisture, and permits the owner or caretaker of the flowers or plants to leave a dwelling for extended periods without worry over such loss. Furthermore, one reservoir takes care of all the plants carried by the pole. The appearance of the pole is both unique and pleasing and it may be used in places where other types of holders would prove cumbersome and out-of-place. Flowers of similar and contrasting colors may be propagated and exhibited in the holder, and the pole itself may be produced in colors conforming to the furniture and color scheme of a room or other place of installation. The pole is durable and lasts indefinitely. A pole of from four and one-half to six feet in length and of from three to five inches in diameter has been found popular among the trade, but obviously the length and diameter may be selected to suit the user or purchaser of the pole, or to conform to the place of installation thereof.

The holder or pole of Fig. 2 is particularly adapted for cut flowers and may be constructed in the same manner as the pole of Fig. 1 except that the automatic watering device or irrigation means and provision therefor is omitted. In this instance the windows are indicated at 6ª and the joints or partitions at 9ª. Poles of this type may be smaller in diameter, a pole of from two to three inches in diameter being found quite popular. Waterproofing and ornamentation may be carried out as in the pole of Fig. 1. In use, this type of pole may have the respective sections thereof supplied with water to a point slightly below the level of the windows and flowers then arranged in each window. Obviously, either cut or growing flowers may be placed in the pole.

A holder of this type may be used to decorate places ordinarily not susceptible or adaptable for decoration by the conventional type of holder, such as vertically on a porch adjacent a driveway, on either side of a fireplace, by a window, in a bedroom adjacent a vanity, dresser or bureau, on the panels of a door opening into a dining room, and like places. They are popular and highly effective when used in store windows and elsewhere in mercantile establishments and for decorating places of business, churches, florist's shops and the like. Practically any kind of flowers may be used with striking effect. It is preferred to arrange the smaller and more delicate types of flowers in a pole of commensurate diameter, while the larger and more showy types of flowers may be arranged in a larger pole. Various designs and color schemes may be adopted, both with respect to the flowers and poles. Even a pole without flowers is interesting and pleasing in appearance and may be made to correspond with the furniture and color scheme of practically any room or place of installation.

The holder of Fig. 5 is particularly adapted for flat surfaces, such as a dining room table or the like. In this case an opening may be cut along the entire length of any selected number of sections or the entire pole, the joints between the sections forming end closures, and between the ends the joints may remain or be removed or be connected for irrigation if desired. A wire mesh screen 14 or the like, preferably non-corrosive, may be applied over the open portion of the holder, thereby providing means for holding cut flowers. Base members 15 are provided at each end of the holder to support the latter in its upright position. A holder of this type may be of any suitable length corresponding with the length of the table or other place of use, and it also has the advantage of not obstructing the view of persons seated on opposite sides of the table. Other uses of this type of holder will be readily apparent.

Numerous other advantages and uses of the flower pole or holder as herein disclosed will be obvious, and it will also be obvious that certain changes in construction and design may be adopted within the scope of the invention as defined by the appended claims.

What I claim is:

1. A holder for flowers and like plants comprising a bamboo pole having a plurality of joints dividing the pole into sections, the joints between the respective sections of the pole serving to partition off said sections and provide one or a plurality of containers for flowers of like or different types, the wall of each section being formed with an opening for filling the containers and for the insertion and display of flowers or like plants, the pole being waterproofed.

2. A holder for flowers and like plants comprising a vertically disposed bamboo pole having hollow sections with joints therebetween partitioning off the pole into a plurality of containers, one of said containers having closed side walls providing a water reservoir section and the wall of the pole at one or more of the remaining sections below the reservoir section each being formed with a window opening, and means for automatically irrigating by gravity flow from the reservoir section the flowers or plants in the sections having the window openings.

3. A holder for flowers and like plants comprising a bamboo pole having hollow sections with joints therebetween partitioning off the pole into a plurality of containers, the wall of the pole at one or more of the sections being formed with a window opening, the top section of the pole serving as a water reservoir and having its wall free of openings, and means for conducting a regulated supply of water from the reservoir to each flower-containing section.

4. A holder for flowers and like plants comprising a hollow bamboo pole having a plurality of sections with window openings for flowers formed in the wall of the pole for each or any selected number of sections, joints between the sections dividing the pole into a plurality of containers, the top section of the pole serving as a water reservoir, openings being formed in the joints of the respective sections, an irrigation tube inserted in said openings with its upper end opening into said reservoir and its lower end closed, irrigation outlets being provided along said tube whereby a regulated supply of water may be automatically fed to each container, the pole being waterproofed.

5. A holder for flowers and like plants comprising a bamboo pole having hollow sections with joints therebetween partitioning off the pole into a plurality of containers, the wall of the pole at one or more of the sections being formed with a window or opening for flowers, the top section of the pole having its wall free of openings and serving as a water reservoir, an irrigation tube inserted downwardly through the joints at the back of the pole and at its upper end opening into said reservoir and at its lower end being closed, valved irrigation outlets in said tube whereby a regulated supply of water may be automatically fed to each container, means affording drainage for said containers, the pole being waterproofed.

6. A flower holder comprising one or more sections of a hollow bamboo pole, the joints which define the sections providing end closures, the pole being cut away providing access to the hollow sections for insertion of flowers, means applied over the cut-away portion for supporting the flowers uniformly along the holder, and base members for supporting the holder.

7. A flower holder particularly adapted for tables and like surfaces comprising one or more sections of a hollow bamboo pole, the wall of the pole being cut away in part to provide access to the hollow sections for insertion of flowers, joints inherent in the bamboo plant providing end closures, a wire mesh flower-retaining member disposed over said cut-away portion, and base members at opposite ends of the pole providing means for supporting the holder in upright position, the wall of the pole being waterproofed.

8. As an article of manufacture, a container for flowers comprising a length of bamboo having natural joints with a hollow section between the joints, the joints providing end walls for the container and the wall of the section between the joints being cut away to provide an opening for insertion of the flowers, the container thus provided being waterproofed.

HARRY V. CAMPBELL.